3,642,343
Feb. 15, 1972

Tchejeyan et al.

[54] LINEAR OPT]
[72] Inventors: Sarkis K. Tchejeyan, South Milwaukee; James A. Repinski, Milwaukee, both of Wis.
[73] Assignee: General Motors Corporation, Detroit, Mich.
[22] Filed: Apr. 30, 1970
[21] Appl. No.: 33,238

[52] U.S. Cl. ............................. 350/6, 178/7.6, 250/234, 350/202, 350/285
[51] Int. Cl. ................................................. G02b 17/00
[58] Field of Search ................... 350/6, 202, 285; 250/234; 178/7.6

[56] References Cited

UNITED STATES PATENTS 2,478,555  8/1949  Yule ................................. 350/214 X
........................... 250/234 X
........................... 350/6 UX

*Primary Examiner*—David Schonberg
*Assistant Examiner*—John W. Leonard
*Attorney*—Jean L. Carpenter, Paul Fitzpatrick and Warren D. Hill

[57] ABSTRACT

A linearly oscillating mirror and an objective lens movable therewith transversely scan an incident light beam and reflect the beam sequentially to a pair of mutually perpendicular mirrors mounted together for linear oscillation in the same direction as the first mirror. A motor driven cam drives the pair of mirrors in phase with and at one-half the amplitude of the first mirror such that the optical path length through the scanning device remains constant.

1 Claims, 3 Drawing Figures

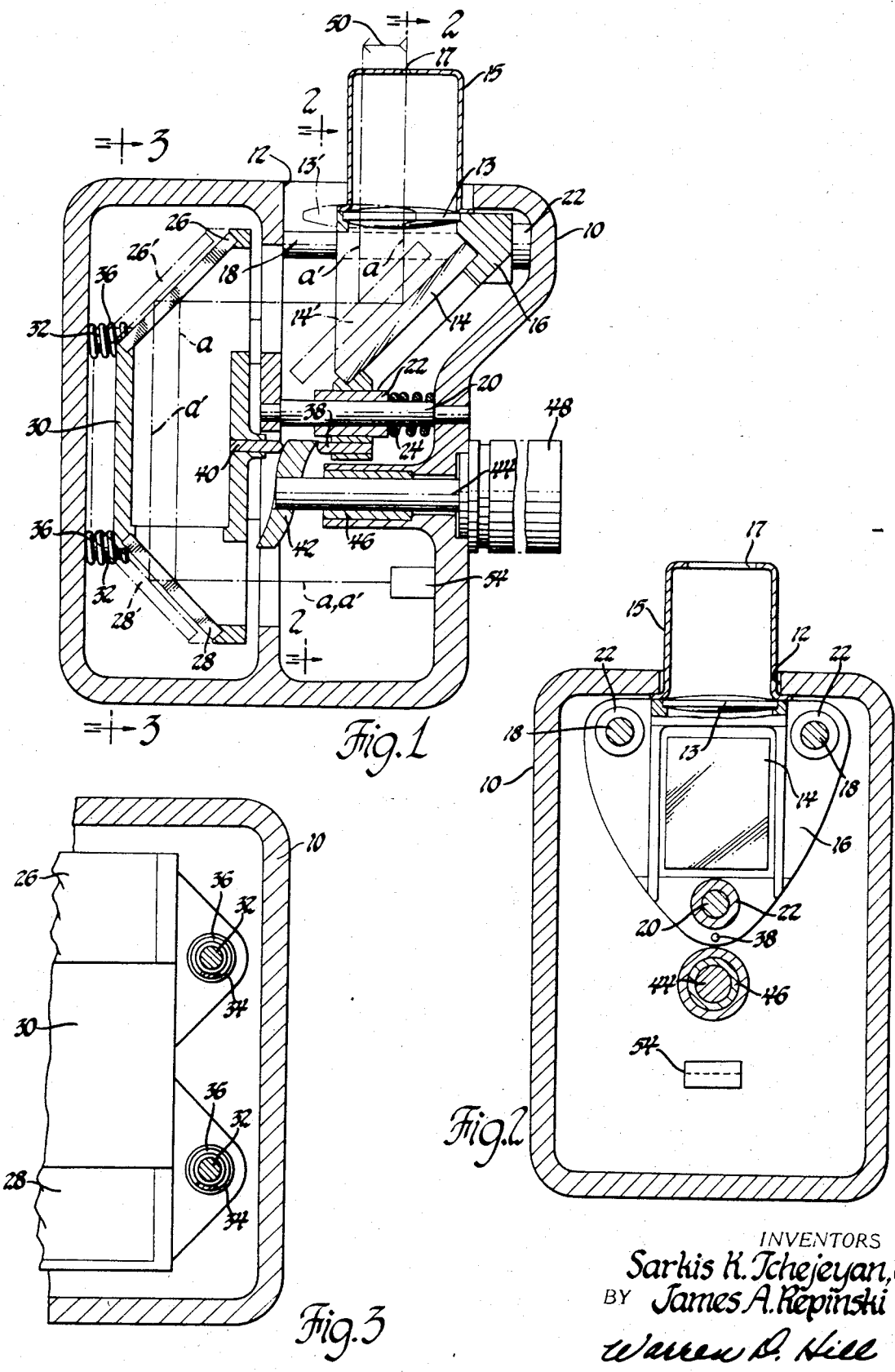

LINEAR OPTICAL SCANNING DEVICE

The invention herein described was made in the course of work under contract or subcontract thereunder with the Department of Defense.

This invention relates to an optical scanning device and particularly to such a device which maintains a constant optical path length.

It is often desired in optical systems to scan an object. This is frequently done by a system of lenses and rotating mirrors which scan the object and attempt to focus the image on some fixed image plane. A problem usually attendant to such systems is that the rotational scanning causes variations in the optical path length so that the image is not accurately focused on the desired image plane.

It is a general object of this invention to provide an optical scanning device having a constant optical path length thereby providing accurate focusing on an image plane.

It is another object of this invention to provide a scanning device incorporating a nonrotating linearly movable scanning mirror.

It is a further object of this invention to provide in a scanning device with a linearly moving objective lens and scanning mirror, and auxiliary mirrors also linearly movable to compensate for any change of optical path length caused by the scanning mirror.

It is yet another object of the invention to provide in an optical scanning device having the aforesaid scanning and auxiliary mirrors, a rotating cam for linearly driving all the mirrors in synchronism.

The invention is carried out by providing in a light beam an angularly disposed mirror linearly movable to transversely sweep through the light beam, a pair of auxiliary mirrors linearly movable in the same direction as the scanning mirror to direct the light reflected from the scanning mirror onto an image plane, and a driving mechanism for all the mirrors to effect a scanning motion of the scanning mirror and to maintain a constant optical path length throughout the system. The invention contemplates that the driving mechanism be a rotating cam which synchronously oscillates the scanning mirror at one amplitude and the auxiliary mirrors by an amount equal to one-half that amplitude. The preferred embodiment of the invention provides an objective lens movable with the scanning mirror for focusing an image onto the image plane.

The above and other advantages will be made more apparent from the following specification taken in conjunction with the accompanying drawings wherein like reference numerals refer to like parts and wherein:

FIG. 1 is a cross-sectional view of a scanning device according to the invention;

FIG. 2 is a cross-sectional view of the apparatus of FIG. 1 taken along lines 2—2; and, FIG. 3 is a partly broken away cross-sectional view of the device of FIG. 1 taken along lines 3—3.

As shown in the drawings, the scanning device of the invention comprises a housing 10 having an aperture 12 directed toward the object, not shown, to be scanned. A scanning mirror 14 is mounted within the housing beneath the aperture 12 for receiving light admitted therethrough. The mirror is disposed at an angle of 45° to the plane of the aperture 12 and is mounted on a bracket 16. An objective lens 13 disposed parallel to the plane of the aperture 12 is also mounted on the bracket 16 as well as a scanning mask 15 having a slit 17. The bracket 16 is supported at its upper end by two rods 18 and at its lower end by a single rod 20, the rods being affixed at their ends to the housing. Guide bushings 22 support the bracket 16 on the rods 18 and 20 to provide easy sliding movement of the bracket 16 along the rods. A coil spring 24 around the right end of the rod 20 bears against the housing 10 and the bushing 22 to bias the bracket 16 toward the left.

First and second auxiliary mirrors 26 and 28 are mounted on a bracket 30 such that the first auxiliary mirror 26 is parallel to the mirror 14 and disposed to receive light reflected from the mirror 14. The second auxiliary mirror 28 is supported at right angles to the mirror 26 and disposed to receive light reflected therefrom. The bracket 30 is carried by a plurality of supporting rods 32 affixed to the housing and disposed parallel to the rods 18 and 20. Bushings 34 slidably mount the bracket 30 on the rods 32. Coil springs 36 around the rods 32 behind the bracket 30 bear against the housing 10 and the bracket 30 to urge the bracket 30 to the right. A pair of aligned cam followers 38 and 40 are supported respectively by the brackets 16 and 30 and bear against opposite faces of a cam 42. The cam 42 is mounted on and arranged to be rotatably driven by a shaft 44 which is supported by a bushing 46 within a hublike projection of the housing 10, and the shaft 44 is driven by a motor 48 located outside the housing 10. The cam 42, acting through cam followers 38 and 40 opposes the forces of the springs 24 and 36 and serves to position the brackets 16, 30 and their respective mirrors according to the shape of the cam and its angle of rotation. As the cam is caused to rotate, the mirror 14, the mask 17 and the objective lens 15 linearly oscillate transversely to the direction of the light entering the aperture 12 and the auxiliary mirrors 26 and 28 similarly oscillate in the same direction.

The opposite faces of the cam 42 are shaped so that the amplitude of movement of the auxiliary mirrors is one-half the amplitude of movement of the scanning mirror 14. Subject to that one requirement, however, the faces of the cam 42 may be formed as desired to obtain the preferred scanning characteristics. The cam form shown in FIG. 1 depicts in a general way a form suitable for driving the scanning mirror 14 such that during each half cycle of cam rotation, the mirror movement is substantially linear with respect to time, assuming a constant rate of cam rotation. If, on the other hand, both cam faces were planar to define a simple wedge, then the mirror movement with respect to time would be sinusoidal.

To best explain the function of the scanning device, an exemplary application is now suggested although this represents but one of many applications which will be apparent to those skilled in the art. Were it desired to scan an object line by line with a photoelectric detector, an image 50 would be formed by a primary objective system (not shown) adjacent the slit 17. The lens 13 would have a focal length such that an image plane would be formed within the housing beyond the mirrors. A detector 54 which may comprise a photodiode array is placed at the image plane so that the photodiode array will be responsive to a single narrow band or line of the image at any given time. As the cam 42 rotates to oscillate the lens 13, the mask 15 and the mirrors, the final image focused at the image plane on the detector 54 will be incremented or changed so that the detector 54 is ultimately serially exposed to all portions of the image 50. The scanning movement of the image is illustrated by a principal light ray "a" from a point on the object on the axis of the lens 13. When the cam 42 is in the position shown in the drawings, the light ray "a" reflects from the several mirrors and focuses at the surface of the detector 54. If, however, the cam is rotated 180°, the several mirrors and the lens 13 move to new positions as shown in phantom lines at 13', 14', 26' and 28' whereupon the light ray follows the path "a'" and focuses on the detector 54. Of course the mask 15 and slit 17 moves with the lens 13 to a new position aligned with the light ray "a'" but for clarity that new position of the mask 15 is omitted from the drawings. It will be apparent that both paths a,a' of the light ray are equal in length because the movement of the auxiliary mirrors compensates for the movement of the scanning mirror 14 so that as a consequence, image points are sharply focused on the surface of the detector 54.

Another advantage of the scanning device not previously described is that since the scanning mask 15, objective lens 13 and the scanning mirror 14 when in any given position subtends only a portion of the light beam representing the image 50, the final image at the detector 54 and therefore the field of view will be of a limited size, but as the scanning mirror 14 changes position, other parts of the image 50 will be brought into focus at the detector 54 thereby effectively increasing the field of view.

It will be obvious to those skilled in the art that the scanning device can be used in conjunction with other optical systems to effect a variety of desired scanning functions.

The foregoing description and drawings merely describe the preferred embodiment of the invention. Obvious modifications and variations will occur to those skilled in the art.

It is claimed:

1. An optical scanning device for scanning a light image to be focused at a fixed image plane and for maintaining accurate focus at the image plane throughout the scanning operation comprising scanning means including a scanning mirror mounted for linear movement normal to a primary ray of the light beam, the plane of the mirror being at an angle of 45° to the said primary ray of the incident beam, the scanning means further including a slitted mask and an objective lens mounted for movement with the scanning mirror for focusing a portion of the image at the image plane for any given position of the scanning mirror, means for compensating for any change in optical path length of the beam occasioned by movement of the scanning mirror including a pair of mutually perpendicular mirrors linearly movable together in the same direction as the movement of the scanning mirror and disposed to sequentially receive light reflected from the scanning mirror, the first mirror of the pair being disposed parallel to the scanning mirror, and motive means including a cam driven by a rotary motor and resilient means biasing the mirrors toward the cam for oscillating the scanning mirror throughout a determined amplitude to scan the beam and for oscillating the pair of mirrors in phase with the oscillation of the scanning mirror and with an amplitude equal to one-half the determined amplitude to compensate for the change in optical path length caused by movement of the scanning mirror.

* * * * *